United States Patent
Yalamanchi (10) Patent No.: US 9,171,282 B2
(45) Date of Patent: Oct. 27, 2015

(54) INTERACTIVE COMPLEX EVENT PATTERN BUILDER AND VISUALIZER

(75) Inventor: Aravind Yalamanchi, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1507 days.

(21) Appl. No.: 12/173,196

(22) Filed: Jul. 15, 2008

(65) Prior Publication Data

US 2009/0106701 A1    Apr. 23, 2009

Related U.S. Application Data

(60) Provisional application No. 60/999,888, filed on Oct. 22, 2007.

(51) Int. Cl.
*G06Q 10/10* (2012.01)
*G06F 17/30* (2006.01)

(52) U.S. Cl.
CPC .......... *G06Q 10/10* (2013.01); *G06F 17/30572* (2013.01)

(58) Field of Classification Search
CPC .................. G06F 17/30592; G06F 17/30572; G06Q 10/10
USPC .................................. 707/702, 792, 796, 797
See application file for complete search history.

(56) References Cited

U.S. PATENT DOCUMENTS

| | | | |
|---|---|---|---|
| 5,608,908 A * | 3/1997 | Barghouti et al. | 719/318 |
| 6,629,106 B1 * | 9/2003 | Narayanaswamy et al. | 1/1 |
| 7,127,467 B2 | 10/2006 | Yalamanchi et al. | |
| 7,150,002 B1 * | 12/2006 | Anderson et al. | 717/107 |
| 2003/0004874 A1 * | 1/2003 | Ludwig et al. | 705/40 |
| 2006/0074735 A1 * | 4/2006 | Shukla et al. | 705/8 |
| 2006/0229923 A1 * | 10/2006 | Adi et al. | 705/8 |
| 2007/0118545 A1 * | 5/2007 | Chandrasekharan et al. | 707/101 |
| 2007/0168990 A1 * | 7/2007 | Alshab et al. | 717/127 |
| 2007/0255529 A1 * | 11/2007 | Biazetti et al. | 702/186 |
| 2008/0016505 A1 * | 1/2008 | Bucklew et al. | 717/174 |
| 2008/0109824 A1 * | 5/2008 | Chen et al. | 719/318 |

OTHER PUBLICATIONS

"Complex Event Processing (CEP)". IBM Research. http://web.archive.org/web/20060211031415/http://domino.watson.ibm.com/comm/research.nsf/pages/r.datamgmt.innovation.cep.html.*

* cited by examiner

*Primary Examiner* — Alexey Shmatov
(74) *Attorney, Agent, or Firm* — Kraguljac Law Group, LLC (57) ABSTRACT

Systems, methods, and other embodiments associated with complex event pattern building are described. One example method includes receiving, on a server-side, requests associated with user interactions with interactive menus. The method includes responding to the requests with commands that build a set of event-condition-action, data that describes an action to take in response to an occurrence of a complex event pattern. The example method may also include automatically converting the event-condition-action data into a programmatic construct that configures a complex event pattern engine to initiate the specified action in response to detecting an occurrence of the complex event pattern.

26 Claims, 7 Drawing Sheets

INTERACTIVE COMPLEX EVENT PATTERN BUILDER AND VISUALIZER

CROSS REFERENCE TO RELATED APPLICATIONS

This application claims the benefit of U.S. provisional patent application Ser. No. 60/999,888, filed on Oct. 22, 2007; inventor Aravind Yalamanchi, and assigned to the present assignee, which is hereby incorporated by reference in its entirety.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

In data processing environments, complex patterns of events representing exceptions, threats, and opportunities occur across application space and time, Businesses can benefit from identifying these patterns and responding automatically. Complex event processing (CEP) is designed to model event patterns, filter, aggregate, and store event histories, and respond to complex event patterns in real time. Typical complex event processing engines employ a rich type system to model events, and define a language to allow declarative specification of event patterns. Some conventional CEP engines model their type system after relational databases. These systems use SQL-like predicates to describe operations on contents of events. This type of system may be difficult for a typical business user without technical training to approach. Furthermore, CEP engines based on Java® type systems may also be difficult to approach for a business user without technical training.

For example, some typical CEP engines employ complex language constructs to allow event pattern specification. This may cause languages used to define event patterns to be highly technical. Unlike IT applications that are developed once and deployed, complex event patterns that identify exceptions, threats, and opportunities in business applications may be highly dynamic, and may be created and managed by non-technical business users. Creating a language that is detailed enough to capture a broad array of complex event patterns and making it friendly for a business user is challenging. Additionally, some CEP engine vendors offer a thick client user interface tool that allows building and visualizing event patterns. However, due to the underlying languages utilized for defining event patterns, these tools may still be technical in nature and may not be able to be part of larger applications suites catered for business users. Furthermore, the thick client user interface may make it difficult and/or expensive to operate conventional systems on multiple clients and from mobile devices.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 7:
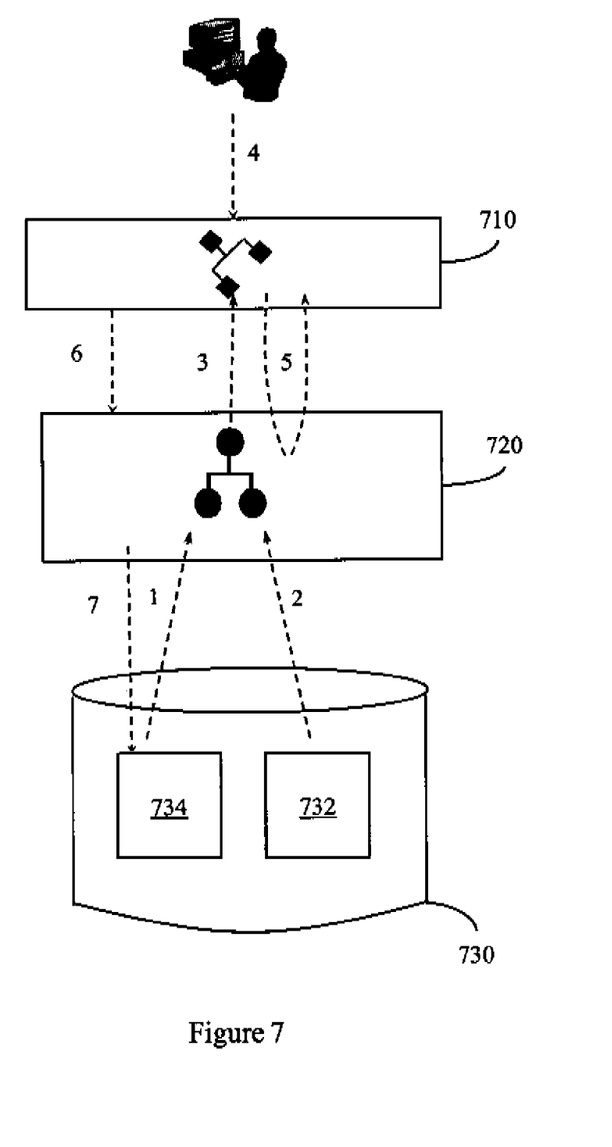
FIG. 7 illustrates an example computing environment in which example systems and methods may operate.

Systems and methods associated with complex event pattern (EP) building are described. FIG. 7 illustrates an environment in which example systems and methods may operate. FIG. 7 illustrates a thin client 710, a middle-tier 720, and a database 730. Database 730 includes a set of aliases and abstractions of common constructs 732. Database 730 also includes a CEP vocabulary 734 that may include metadata and rules. In one example, a first action 1 may include loading a CEP pattern and/or rule from the database 730 into the middle tier 720. A second action 2 may include loading aliases and/or abstractions from the database 730 into the middle tier 720. A third action 3 may including mapping the memory representation to the thin client 710 representation. In one example the thin client 710 representation may be in HTML. A fourth action 4 occurs when a user operates on the tree in the thin client 710. A set of fifth actions 5 includes incremental operations on the tree with partial refreshes. A sixth action 6 includes confirming changes to the CEP pattern. After confirming the changes, a seventh action 7 includes persisting the changes by writing to the database 730.

In one example, a user makes a selection on a set of interactive menus that include information associated with events, conditions, and actions. The event patterns may be modeled as event-condition-action (ECA) rules, and the interactive menus may be presented by a thin client for pattern manipulation. In one example, the thin client may be an HTML web client. Implementing the interactive menus in an HTML web client may facilitate modification of ECA rules without requiring a large application to be downloaded or installed. Further, a thin client may facilitate modification of ECA rules on mobile devices. The thin client may also allow the user to view the event patterns as a hierarchy of event relationships, a hierarchy of specific events, and/or a hierarchy of conditions on event content. In the thin client, the event relationships and the conditions on the contents of events are represented as a tree with nodes for each artifact. The tree can be manipulated by clicking on a node, which will in turn activate the associated menu of operations allowed on that node. This menu is driven by the pre-set rules that determine the valid operations for a specific node based on its relative position in the tree and its context information. The thin client interacts with middle-tier that receives the commands for user clicks and menu item selections and responds with instructions to modify the tree representation on the client accordingly. By maintaining an in-memory version of the tree displayed to the client tool, the middle-tier minimizes the communication and the amount of information transferred between the client and the server. Upon completing an event pattern and selecting an action to be executed when this pattern is detected in real-time, the client submits ECA data to the CEP engine.

Upon receiving ECA data from the thin client, a configuration logic may configure a CEP engine to initiate an action specified by the ECA data in response to the occurrence of one or more events that match the pattern specified by the ECA data. An event pattern may include, for example, an occurrence of a single event, an occurrence of a single event under a single condition, an occurrence of multiple events under a single condition, an occurrence of single event under multiple conditions, or an occurrence of multiple events under multiple conditions. In one example, the CEP engine may be configured by adding a listener object that initiates an action described by the ECA data to a set of listener objects. The listener object may be programmed to react to an occurrence of an event pattern described by the ECA data. In another example, configuring the CEP engine may include programming the CEP engine to initiate an action in response to an occurrence of an event pattern. By using a graphical user interface including interactive menus and programmatically generating code based on input from the menus, example systems and methods may allow users to manage complex event patterns without an in depth understanding of programming. This may make CEP management more accessible to users with a limited technical background. Further, the thin client may make CEP management usable on a larger variety of systems and devices.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable,
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM,
SQL: structured query language.
OQL: object query language.
USB: universal serial bus.
XML: extensible markup language.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
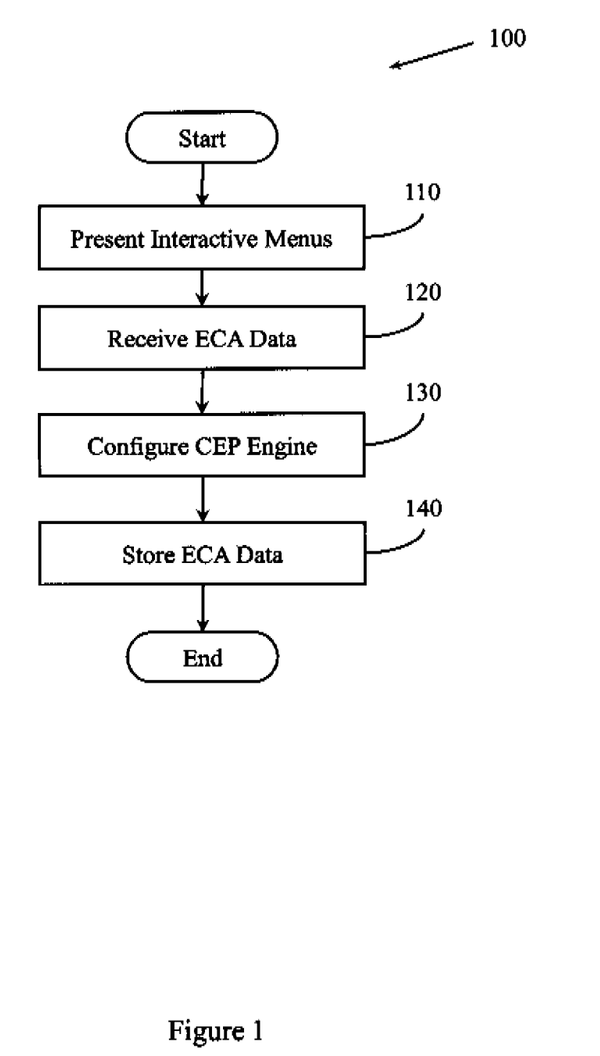
FIG. 1 illustrates an example method associated with complex event pattern building.

FIG. 1 illustrates a method 100 associated with building complex event patterns. Method 100 includes, at 110, presenting a set of interactive menus. The interactive menus may be presented by, an HTML client, a thin client, a Java® client, and so on. A thin client may not require an extensive installation. In one example, an HTML client and a Java® client may be thin clients. The set of interactive menus may be presented to a user. The interactive menus may include information associated with events, conditions and actions. The events, conditions, and actions may relate to a function performed by a complex event processing (CEP) engine. The CEP engine may relate to an application associated with, for example, radio frequency Identification (RFID), fraud, risk, sales, customer relationship management, cross-selling, data filtering, data transformation, semantic web domain node communications, and so on.

Possible events may include, an update to a database, a receipt of a purchase order, a change to a stored value, a receipt of a signal, a user driven input, and so on. Possible conditions may include, a state of an attribute of an event, an occurrence of an event, a nonoccurrence of an event, an occurrence of a set of events, an occurrence of a set of events within a pre-defined time period, an occurrence of a sequence of a set of events, an occurrence of a subset of a set of events, an occurrence of an aggregation of a set of events, and so on, which could model scenarios such as potential threats, exceptions and opportunities. Possible actions may include, a change to a database, a provision of a signal, a change to a stored value, a notification to a user, an initiation of a function, and so on.

For example, a first event may be a purchase of, from a series of five books, the first book in the series, a second event may be a purchase of the second book in the series, a third event may be a purchase of the third book in the series, and so on. Some example conditions may include the occurrence of the first event and the occurrence of the second event within one week of each other, the occurrence of the first event and the occurrence of the third event without the occurrence of the second event, and so on. These events and events occurring under a condition describe different complex event patterns in response to which various actions may be taken. A possible action to take in response to the occurrence of the first event may be to offer the second book in the series at a discount. A possible action to take in response the occurrence of the first event and the occurrence of the third event without the occurrence of the second event may be to notify the purchaser that they may have missed the second book in the series. One skilled in the art can see how other events, conditions, actions, and combinations thereof may be employed.

Method 100 also includes, at 120, receiving a set of event-condition-action (ECA) data. The ECA data may be received in response to a selection being made on an interactive menu. The ECA data may include data identifying an event, a condition, and/or an action.

The ECA data may identify actions to perform in response to detecting events occurring under conditions. The action may also be performed in response to an occurrence of a complex event pattern. An event pattern may include a set of events, and a set of conditions associated with the set of events. An event pattern may include, for example, an occurrence of a single event, an occurrence of a single event under a single condition, an occurrence of multiple events under a single condition, an occurrence of single event under multiple conditions, or an occurrence of multiple events under multiple conditions.

Example event patterns related to book purchasing may include, a purchase of a first book in a series, a purchase of a first book in a series during a specific time period, a purchase of a first book in a series and a purchase of a second book in the series within a predefined time window, a purchase of a first book in a series during a sale period after a predefined time, a purchase of a first book in a series and a purchase of a second book in the series within a predefined time window and without the purchase of a third book in the series, and so on. While a book selling example is provided above, one skilled in the art will appreciate that CEP may be employed in other areas (e.g. RFID, fraud, risk, sales, and so on).

Method 100 also includes, at 130, configuring a CEP engine to initiate an action in response to detecting an occurrence of events matching the specified pattern. Detecting the occurrence may be based, at least in part, on the ECA data. In one example, configuring the CEP engine may include adding a listener object that initiates an action described by the ECA data to a set of listener objects. In this example, the listener object may be programmed to detect an occurrence of events described by the ECA data. In another example, configuring the CEP engine may include programming the CEP engine to initiate an action described by the ECA data in response to detecting an occurrence of events matching the pattern described by the ECA data.

Method 100 also includes, at 140, storing the ECA data in a data store. The ECA data may be stored as, for example, a hierarchy of event relationships, a hierarchy of events, a hierarchy of conditions on event content, and so on. A hierarchy may be stored as, for example, a tree, an array, a linked list, a database, a table, and so on. In one example, the data store may also include the information associated with events, conditions, and actions presented at 110. In another example, the ECA data may be stored to facilitate the provision of a graphical representation of a portion of a hierarchy of ECA relationships stored in the data store. In another example, ECA data may be stored to facilitate backing up and/or restoring one or more configurations associated with the CEP engine.

Below is example code based on XML and SQL associated with a security application. The code may be generated at 130 in relation to configuring the CEP engine.

```
ON
BankTransaction (subjectId, transType, amount, fundFrom) bank,
Transportation (subjectId, vesselType, ..., endDate) transport,
FieldReport (subjectId, rptType, whoWith, ...) fldrpt
IF
  <condition>
    <and>
      <object name="bank">
        tranType = 'Transfer' and amount > 10000 and fundFrom != 'USA'
      </object>
      <object name="transport">
        vesselType = 'Truck' and locFrom != locTo and
            IsRestrictedArea(locTo) = 1
      </object>
      <not by="SYSTIMESTAMP+1">
        <object name="fldrpt">
          rpttype = 'BACKGROUNDCHECK' and EXTRACT(RPTBODY,
              '/history/arrests[@number=0]') IS NOT NULL
        </object>
      </not>
    </and>
  </condition>
THEN
  PerformAction('ADD2HIGHRISKAREA', transport.locTo)
```

This code segment acts upon detecting a bank transaction event, a transportation event, and a field report event all associated with a subject. The code segment makes a series of checks on incoming events to determine if action is necessary. The code checks the bank transaction event to see if the transaction is greater than $10000 and if it originated outside the United States. The code also checks, for the transport event, to see if the vessel type is a truck, and if the destination of the subject is a restricted area and there is no matching instance of field report event within a 24 hour window. If the conditions checked by the code match the event pattern, the code initiates an action of labeling the destination of the subject as high risk. The matching of the events with the specified event patterns is performed incrementally as the events are streamed into the CEP engine. In this respect each event pattern behaves like a state machine, which initiates the corresponding action when it reaches an accepting state. One skilled in the art can see how other events, conditions, actions, and combinations thereof may be employed to perform other tasks.

While FIG. 1 illustrates various actions occurring in serial, it is to be appreciated that various actions illustrated in FIG. 1 could occur substantially in parallel. By way of illustration, a first process could present a set of interactive menus, a second process could receive a set of ECA data, and a third process could configure the CEP engine. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

In one example, data structures may be constructed that facilitate storing data on a computer-readable medium and/or in a data store. Thus, in one example, a computer-readable medium may store a data structure that includes, a first field for data associated with events, a second field for data associated with conditions, and a third field for data associated with actions. With this "raw" data available, the data structure may also include a fourth field for storing CEP data that is derived from data located in one or more of the first through third fields. While four fields are described, it is to be appreciated that a greater and/or lesser number of fields could be employed.

Figure 2:
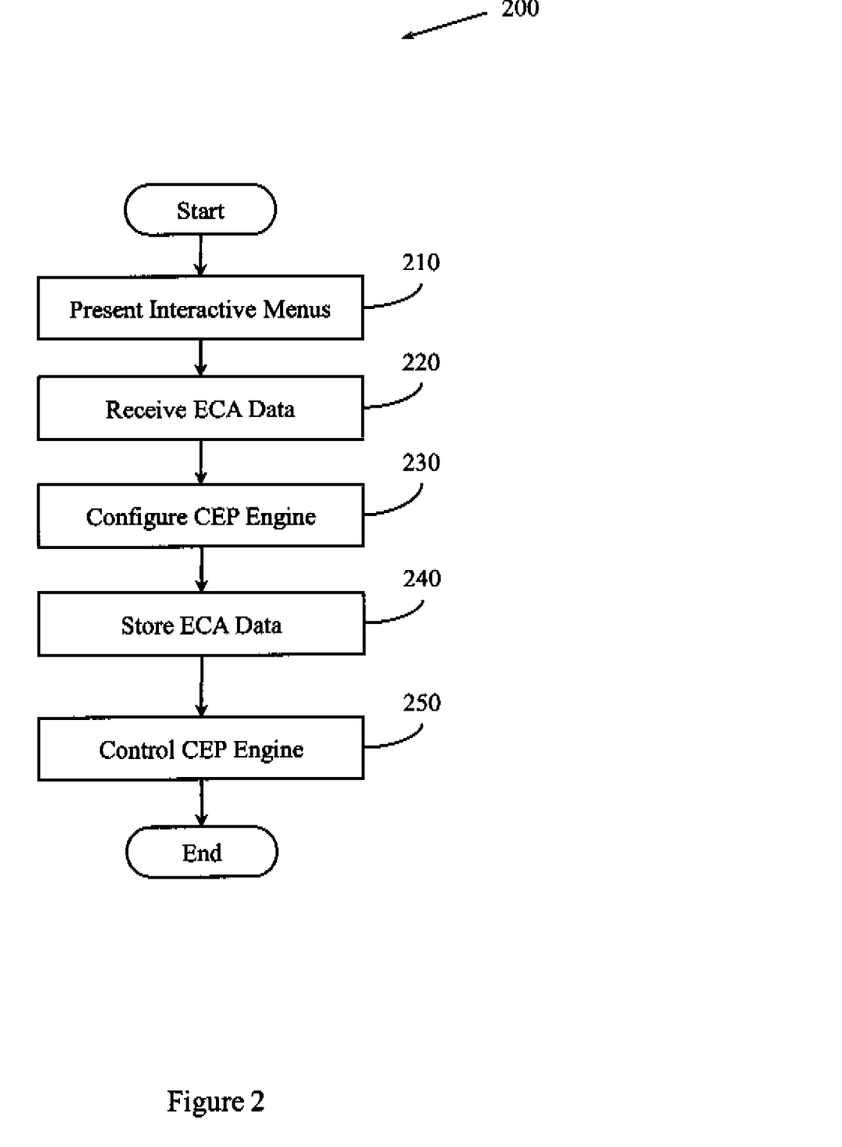
FIG. 2 illustrates an example method associated with complex event pattern building.

FIG. 2 illustrates a method 200 associated with building a complex event pattern. Method 200 includes several actions similar to those described in connection with method 100 (FIG. 1). For example, method 200 includes presenting a set of interactive menus at 210, receiving a set of ECA data at 220, configuring a CEP engine at 230, and storing the ECA data at 240. However, method 200 also includes, at 250, controlling the CEP engine to initiate the action. The action may be initiated in response to the CEP engine detecting an occurrence of events matching a pattern specified by the ECA data. For example, in response to detecting that a person has purchased a first book in a series of books, and a second book in the series, but has not purchased a third book in the series, the CEP engine may be controlled to notify the person that they may be missing a book. The CEP engine may also be controlled to offer the third book in the series at a discount or as a package to encourage the person to purchase the book.

Figure 3:
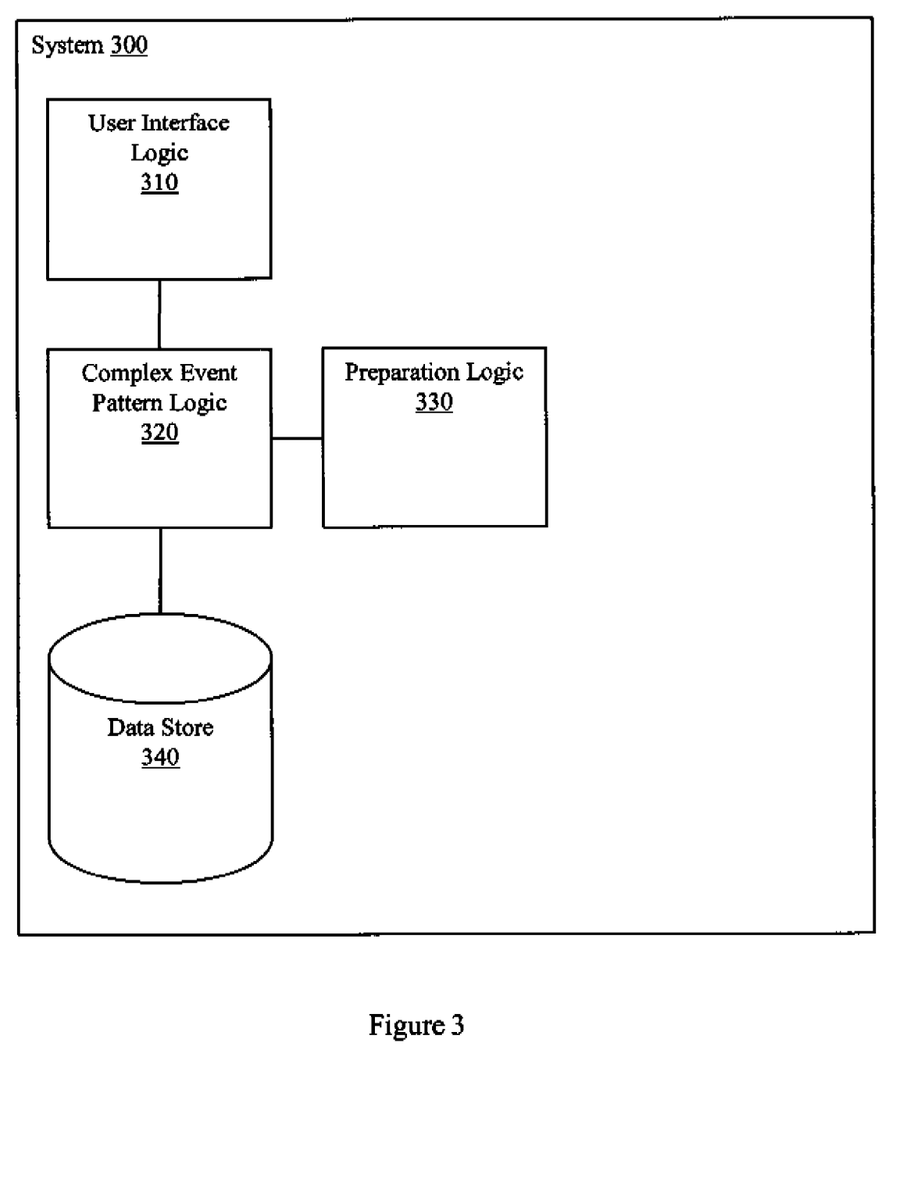
FIG. 3 illustrates an example system associated with complex event pattern building.

FIG. 3 illustrates a system 300 associated with building a complex event pattern. System 300 includes a user interface logic 310. User interface logic 310 may provide a set of interactive menus. The interactive menus may be provided by, an HTML client, a thin client, a Java® client, and so on. A thin client may not require an extensive installation. In one example an HTML client and a Java® client may be thin clients. The set of interactive menus may be provided to a user. The interactive menus may include information associated with events, conditions, and actions. The events, conditions, and actions may be associated with real world business tasks including sales, inventory management, finances, and so on. The events, conditions, and actions may relate to a function performed by a complex event processing (CEP) engine. The function may be, for example, offering a discount, arranging a shipment, initiating a money transfer, and so on. The CEP engine may relate to an application associated with, for example, RFID, fraud, risk, sales, customer relationship management, cross-selling, data filtering, data transformation, semantic web domain node communications, and so on.

Possible events may include, an update to a database, a receipt of a purchase order, a change to a stored value, a receipt of a signal, a user driven input, and so on. Possible conditions may include, a state of an attribute of an event, an occurrence of an event, a nonoccurrence of an event, an occurrence of a set of events, an occurrence of a set of events within a pre-defined time period, an occurrence of a sequence of a set of events, an occurrence of a subset of a set of events, an occurrence of an aggregation of a set of events, and so on. Possible actions may include, a change to a database, a provision of a signal, a change to a stored value, a notification to a user, an initiation of a function, and so on.

System 300 also includes, a CEP logic 320 to present the event metadata and the valid event pattern constructs in the form of interactive menus to the user-interface logic 310. An event pattern is represented as a hierarchy of nodes consisting of the events, conditions on the contents of the events as well as the complex relationships that exist between the events. Possible transformations on each node of the event pattern tree are controlled by the relative position of the node in the tree as well as the context information. The end-user communicates his intent to manipulate the event pattern by clicking on a relevant node as represented in the thin client. The CEP logic 320 receives this request and based on the current state of the tree and the rules involving the CEP patterns generates a list of valid operations on the selected node. Depending on the type and context of the node selected, the valid operations could be to add a condition on the content of the event, add a specific event to occur in conjunction with other events, add a predicate for the detecting the events occurring within a time-window and so on. The list of valid operations generated by the CEP logic 320 is communicated back to the user-interface logic 310, which in turn displays them in an interactive menu. The CEP logic 320 also receives the requests arising from the selections made on the interactive menus. The CEP logic 320 processes the requests by making necessary modification to the in-memory version of the event pattern tree and sends back commands to user-interface logic 310 to make similar modifications to the tree displayed in the thin-client. The CEP logic 320, by maintaining an in-memory version of the evolving event pattern and encapsulating the logic that controls the possible operations on the tree, minimizes the communication and the amount of information transferred between the user-interface logic 310 and the CEP logic 320. The CEP logic 320 aids in the building of ECA data for a rule that, includes a complete event pattern with specific conditions and the possible actions to perform in response to detecting events occurring under conditions expressed by the event patterns. An event pattern constructed using the CEP logic 320 and the user-interface logic 310 may include a set of events and a set of conditions associated with the set of events. An event pattern may include, for example, an occurrence of a single event, an occurrence of a single event under a single condition, an occurrence of multiple events under a single condition, an occurrence of single event under multiple conditions, or an occurrence of multiple events under multiple conditions.

System 300 also includes a preparation logic 330. Preparation logic 330 may prepare a CEP engine to initiate an action in response to detecting the occurrence of events based, at least in part, on the ECA data. In one example, preparing the CEP engine may include adding a listener object that initiates an action described by the ECA data to a set of listener objects. In this example, the listener object may be programmed to detect an occurrence of events matching the pattern described by the ECA data. In another example, preparing the CEP engine may include programming the CEP engine to initiate an action described by the ECA data in response to detecting an occurrence of events matching the pattern described by the ECA data. In one example, the XML and SQL based code sample shown above may be generated by the CEP engine based on the final representation of the ECA data and used by preparation logic 330 to prepare the CEP engine.

System 300 also includes a data store 340. Data store 340 may store the ECA data. ECA data may be stored in the data store by the CEP logic. The ECA data may be stored as, for example, a hierarchy of event relationships, a hierarchy of events, a hierarchy of conditions on event content, and so on. A hierarchy may be stored as, for example, a tree, an array, a linked list, a database, a table, and so on. In one example, the database may also include the information associated with events, conditions, and actions provided by the user interface logic 310. In another example, the ECA data may be stored in data store 340 to facilitate providing a graphical representation of a portion of a hierarchy of ECA relationships stored in data store 340 by user interface logic 310. In another example, ECA data may be stored in data store 340 to facilitate backing up, restoring, preparing, and/or re-preparing the CEP engine by preparation logic 320.

Figure 4:
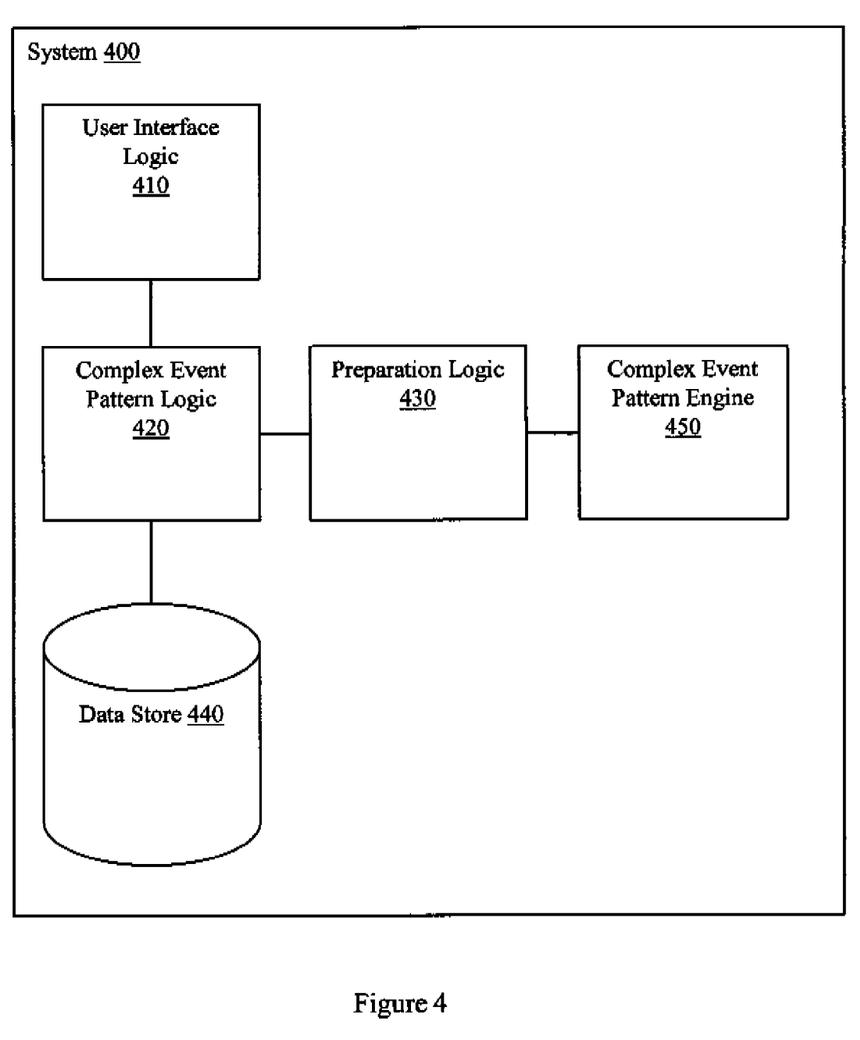
FIG. 4 illustrates an example system associated with complex event pattern building.

FIG. 4 illustrates a system 400 associated with building a complex event pattern. System 400 includes several items similar to those described in connection with system 300 (FIG. 3). For example, system 400 includes an user interface logic 410, a CEP logic 420, a preparation logic 430, and a data store 440. However, system 400 also includes a CEP engine 450. CEP engine 450 may initiate the action CEP engine 450 was prepared to perform in response to detecting an occurrence of the events matching a pattern the CEP engine 450 was prepared to detect. The action may be initiated in response to the CEP engine detecting an occurrence of events matching a pattern specified by the ECA data. For example, in response to detecting that a person has purchased a first book in a series of books, and a second book in the series, but has not purchased a third book in the series, the CEP engine may be controlled to notify the person that they may be missing a book. The CEP engine may also be controlled to offer the third book in the series at a discount or as a package to encourage the person to purchase the book.

Figure 5:
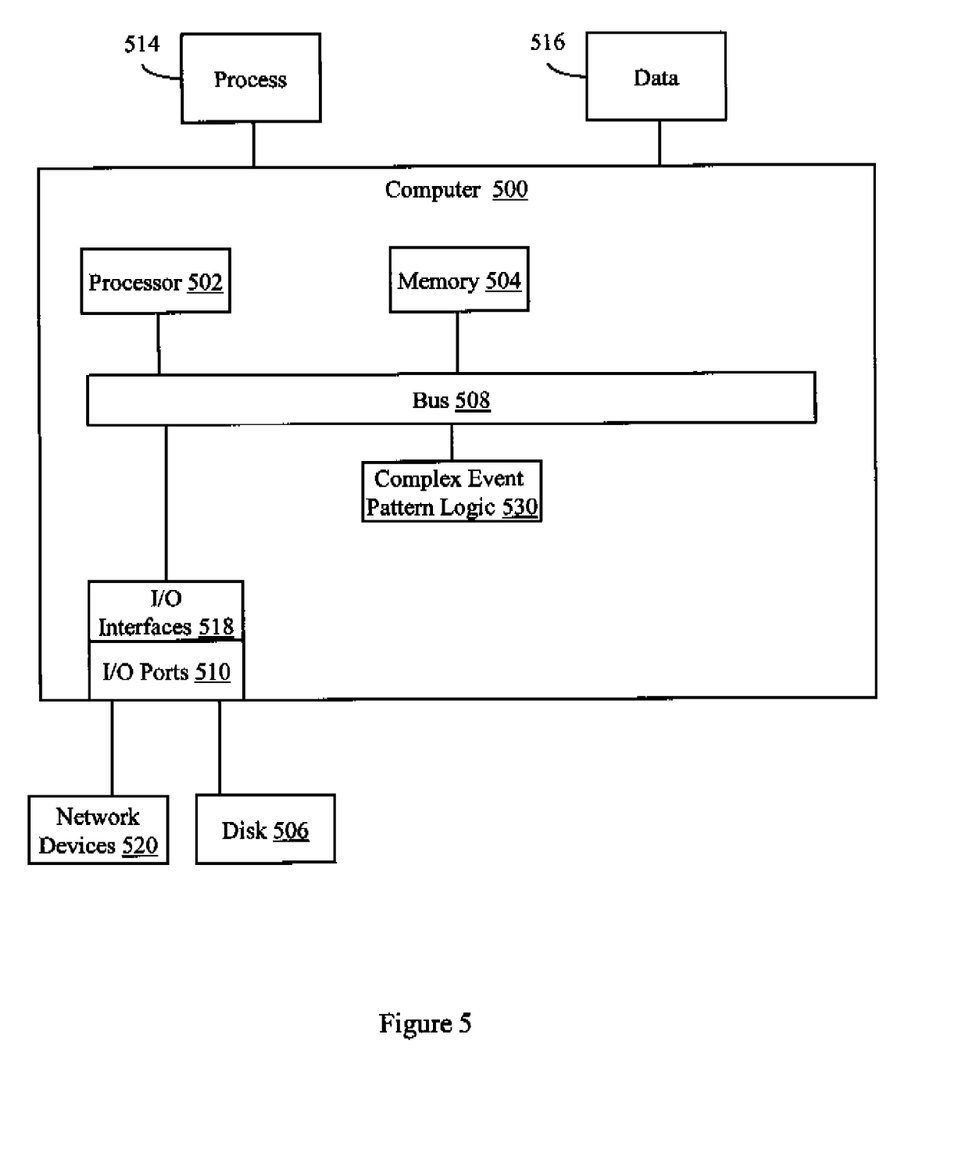
FIG. 5 illustrates an example computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a complex event pattern logic 530 configured to facilitate building event patterns. In different examples, the logic 530 may be implemented in hardware, software, firmware, and/or combinations thereof. While the logic 530 is illustrated as a hardware component attached to the bus 508, it is to be appreciated that in one example, the logic 530 could be implemented in the processor 502.

Thus, logic 530 may provide means (e.g., hardware, software, firmware) for presenting a set of interactive menus that include information associated with events, conditions, and actions, where the events conditions and actions relate to a function performed by a CEP engine. Logic 530 may also provide means (e.g., hardware, software, firmware) for receiving, in response to a selection being made on an interactive menu, a set of ECA data that includes data identifying one or more of, an event, a condition, and an action. The action may be performed in response to an event pattern including a set of events and a set of conditions associated with the set of events. Logic 530 may also provide means (e.g., hardware, software, firmware) for configuring a CEP engine to initiate an action in response to detecting the occurrence of events. Detecting the occurrence may be based, at least in part, on the ECA data. Logic 530 may also provide means (e.g., hardware, software, firmware) for storing the ECA data. The means associated with logic 630 may be implemented, for example, as an ASIC. The means may also be implemented as computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multiprocessor architectures. A memory 504 may include volatile memory and/or non-volatile memory. Non-volatile memory may include, for example, ROM, PROM, and so on, Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM drive, a Blu-Ray drive, an HD-DVD drive, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

Figure 6:
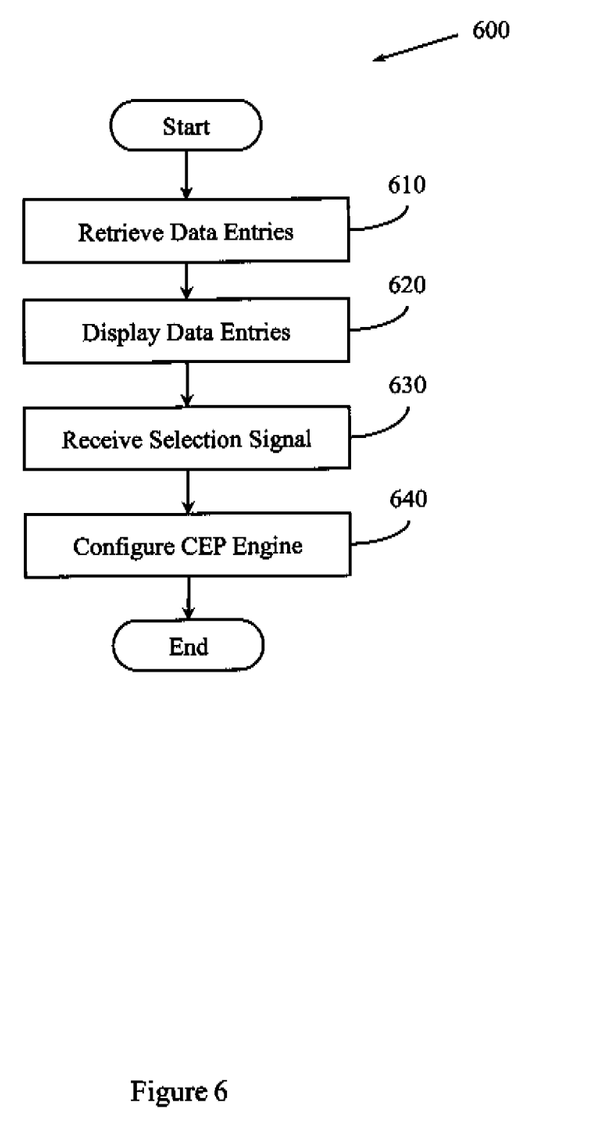
FIG. 6 illustrates an example method associated with complex event pattern building.

FIG. 6 illustrates a method 600 associated with complex event pattern building. Method 600 may be performed by a computer system having a graphical user interface. The graphical user interface may include a display and a selection device. Method 600 may be associated with providing and selecting from a set of data entries on the display. Method 600 includes, at 610, retrieving a set of data entries. The set of data entries may be received from a data store associated with a CEP engine. A data entry may represent a construct in the event pattern or an action to perform in response to the occurrence of the events. Method 600 also includes, at 620, displaying the set of data entries on the display in a set of interactive menus. The interactive menus may allow a business user without technical training to visualize and manipulate data associated with the CEP engine without learning programming skills.

Method 600 also includes, at 630, receiving a data entry selection signal from the set of interactive menus. The data entry selection signal may be indicative of the selection device selecting a selected data entry. For example a user may select a condition (e.g. a temporal relationship, a conjunction relationship, a disjunction relationship, and so on) from a member of the set of interactive menus to be applied to a set of events to create an event pattern. The user may then select an action from a member of the set of interactive menus to be performed in response to the newly created event pattern. Method 600 also includes, at 640, configuring a CEP engine in response to the data entry selection signal. The CEP engine may be configured to initiate an action in response to an occurrence of some events that match the specified pattern. For example, the CEP engine may be configured by programmatically generating the XML and SQL based code sample shown above and storing it in a data store.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to:

present a set of interactive menus, on a display screen, that include information associated with events, conditions, and actions, where the events, conditions, and actions relate to a function performed by a complex event pattern (CEP) engine;

receive, in response to a selection being made on the interactive menus, a set of event-condition-action (ECA) data that includes data identifying one or more of, an event, a condition, and an action, where the action is to be performed in response to an occurrence of a complex event pattern comprising a set of events and a set of conditions associated with the set of events that match the ECA data;

generate an event pattern tree as a hierarchy of nodes that represent the ECA data and displaying the hierarchy of nodes on the display screen;

manipulate the hierarchy of nodes via the display screen to modify the event pattern tree in response to a node being selected from the display screen;

determine and provide a list of valid operations for the selected node based on a relative position of the selected node in the event pattern tree;

control a transformation of the selected node in the hierarchy of nodes on the display screen based in part by the relative position of the selected node in the event pattern tree and a selected operation from the list of valid operations;

configure a complex event pattern (CEP) engine to initiate an action in response to detecting an occurrence of the complex event pattern, where detecting the occurrence is based, at least in part, on the ECA data; and store the ECA data in a data store.

2. The computer-readable medium of claim 1, where the interactive menus are presented by one or more of, an HTML client, a thin client, and a Java® client.

3. The computer-readable medium of claim 1, further comprising instructions configured for defining an event as an update to a database, a receipt of a purchase order, a change to a stored value, a receipt of a signal, or a user driven input.

4. The computer-readable medium of claim 1, further comprising instructions configured for defining a condition as a state of an attribute of an event, an occurrence of an event, a nonoccurrence of an event, an occurrence of a set of events, an occurrence of a set of events within a pre-defined time period, an occurrence of a sequence of a set of events, an occurrence of a subset of a set of events, or an occurrence of an aggregation of a set of events.

5. The computer-readable medium of claim 1, further comprising instructions configured for defining an action as a change to a database, a provision of a signal, a change to a stored value, a notification to a user, or an initiation of a function.

6. The computer-readable medium of claim 1, where the ECA data includes data that identifies one or more actions to perform in response to detecting one or more events occurring under one or more conditions.

7. The computer-readable medium of claim 1, further comprising instructions configured for storing the ECA data as one or more of, a hierarchy of event relationships, a hierarchy of events, and a hierarchy of conditions on event content, and where the hierarchy is stored as one of a tree, an array, a linked list, a database, and a table.

8. The computer-readable medium of claim 1, further comprising instructions configured for configuring the complex event pattern to include an occurrence of a single event, an occurrence of a single event under a single condition, an occurrence of multiple events under a single condition, or an occurrence of multiple events under multiple conditions.

9. The computer-readable medium of claim 1, where the complex event pattern (CEP) engine is configured to relate to an application associated with one or more of, radio frequency identification (RFID), fraud, risk, sales, customer relationship management, cross-selling, data filtering, data transformation, and semantic web domain node communications.

10. The computer-readable medium of claim 1, where configuring the complex event pattern (CEP) engine includes instructions for adding a listener object that initiates an action described by the ECA data to a set of listener objects, where the listener object is programmed to detect the complex event pattern described by the ECA data.

11. The computer-readable medium of claim 1, where configuring the complex event pattern (CEP) engine includes instructions for programming the CEP engine to initiate an action described by the ECA data in response to detecting the complex event pattern described by the ECA data.

12. The computer-readable medium of claim 11, where configuring the complex event pattern (CEP) engine includes instructions for storing executable instructions written in a combination of SQL and XML in the complex event pattern (CEP) engine.

13. The computer-readable medium of claim 1, further comprising instructions for controlling the complex event pattern (CEP) engine to initiate the action.

14. A non-transitory computer-readable medium storing computer-executable instructions, the instructions, comprising:

a user interface logic configured to provide a set of interactive menus that display information associated with events, conditions, and actions, where the events, conditions, and actions relate to a function performed by a complex event processing (CEP) engine and to display an evolving event pattern as a hierarchical structure formed with nodes that includes events participating in the event pattern, conditions on the contents of the events participating in the event pattern, and a desired relationship between the events participating in the event pattern;

a complex event processing (CEP) logic configured to receive requests arising from user interactions with the set of interactive menus and to respond with commands that manipulate the evolving event pattern via the nodes in the hierarchical structure that is displayed to build a set of event-condition-action (ECA) data that includes data identifying a complex event pattern comprising a set of events and a set of conditions associated with the set of events, and a set of actions to be performed in response to the detection of the event pattern;

where the CEP logic provides to the user interface logic a set of valid operations for modifying the evolving event pattern via the nodes in the hierarchical structure, where the set of valid operations for a selected node depends, at least in part, on a relative position in the hierarchical structure of the selected node associated with the evolving event pattern;

wherein to manipulate the evolving event pattern, the complex event processing logic is further configured to control a transformation of selected node in the hierarchical structure of nodes on the display based in part by the relative position of the selected node in the evolving event pattern and an operation selected from the set of operations for the selected node;

a preparation logic configured to prepare a complex event processing (CEP) engine to initiate an action in response to the occurrence of an event pattern that matches based, at least in part, on the ECA data; and instructions for storing the ECA data in a data store.

15. The system of claim 14, where the user interface logic provides the interactive menus using an HTML client or a thin client.

16. The system of claim 14, where the CEP logic maintains an in-memory version of the evolving event pattern and where the CEP logic validates a user request based, at least in part, on the in-memory version of the evolving event pattern.

17. The system of claim 14, where the CEP logic provides a member of the set of interactive menus to the user interface logic.

18. The system of claim 17, where the member of the set of interactive menus includes one or more of, metadata, and a valid event pattern construct.

19. The system of claim 14, where an event is one of, an update to a database, receipt of a purchase order, a change to a stored value, a receipt of a signal, and a user driven input;

where a condition is one of, a state of an attribute of an event, an occurrence of an event, a nonoccurrence of an event, an occurrence of a set of events, an occurrence of a set of events within a pre-defined time period, an occurrence of a sequence of a set of events, an occurrence of a subset of a set of events, and an occurrence of an aggregation a set of events; and where an action is one of, a change to a database, a provision of a signal, a change to a stored value, a notification to a user, and an initiation of a function.

20. The system of claim 14, where the ECA data stored in the data store facilitates one or more of, backing up, restoring, preparing, and re-preparing the CEP engine by the preparation logic.

21. The system of claim 14, where the preparation logic prepares the CEP engine, at least in part, by adding a listener object that initiates an action described by the ECA data to a set of listener objects, where the listener object is programmed to detect an event pattern described by the ECA data.

22. The system of claim 14, where the preparation logic prepares the CEP engine by, at least in part, programming the CEP engine to initiate an action described by the ECA data in response to detecting an event pattern described by the ECA data.

23. The system of claim 22, where preparing the CEP engine includes storing executable instructions written in a combination of SQL and XML in the CEP engine.

24. A non-transitory computer-readable medium storing computer-executable instructions that when executed by a computer cause the computer to perform actions, the computer-executable instructions comprising:

instructions for presenting a set of interactive menus, on a display screen, that include information associated with events, conditions, and actions;

instructions for receiving, in response to a selection being made on the interactive menus, a set of event-condition-action (ECA) data that identifies an event, a condition, and an action that define an event pattern, where the action is to be performed in response to an occurrence of a complex event pattern that matches the event pattern;

instructions for generating an event pattern tree as a hierarchy of nodes that represent the event pattern and displaying the hierarchy of nodes on the display screen;

instructions for manipulating the hierarchy of nodes via the display screen to modify the event pattern by transforming a node on the display screen after being selected, wherein in response to a node being selected from the display screen, determining and providing a set of valid operations for the selected node based on a relative position of the selected node in the hierarchy of nodes and transforming the selected node in response to a selected operation from the set of valid operations; and instructions for configuring a complex event pattern (CEP) engine to initiate an action in response to detecting an occurrence of the complex event pattern that matches the event pattern.

25. A computer-implemented method performed by a computer and at least a processor executing stored instructions from a memory, the method comprising:

presenting a set of interactive menus, on a display screen of the computer, that include information associated with events, conditions, and actions;

receiving, in response to a selection being made on the interactive menus, a set of event-condition-action (ECA) data that identifies an event, a condition, and an action that define an event pattern, where the action is to be performed in response to an occurrence of a complex event pattern that matches the event pattern;

generating an event pattern tree in an electronic form as a hierarchy of nodes that represent the event pattern and displaying the hierarchy of nodes on the display screen;

manipulating the hierarchy of nodes via the display screen to modify the event pattern by transforming a node on the display screen after being selected, wherein in response to a node being selected from the display screen, determining and providing a set of valid operations for the selected node based on a relative position of the selected node in the hierarchy of nodes and transforming the selected node in response to a selected operation from the set of valid operations; and configuring a complex event pattern (CEP) engine to initiate an action in response to detecting an occurrence of the complex event pattern that matches the event pattern.

26. A computer-implemented method performed by a computer and at least a processor executing stored instructions from a memory, the method comprising:

presenting a set of interactive menus, on a display screen of the computer, that include information associated with events, conditions, and actions, where the events, conditions, and actions relate to a function performed by a complex event pattern (CEP) engine;

receiving, in response to a selection being made on the interactive menus, a set of event-condition-action (ECA) data that includes data identifying one or more of, an event, a condition, and an action, where the action is to be performed in response to an occurrence of a complex event pattern comprising a set of events and a set of conditions associated with the set of events that match the ECA data;

generating an event pattern tree in electronic form as a hierarchy of nodes that represent the ECA data and displaying the hierarchy of nodes on the display screen;

manipulating the hierarchy of nodes via the display screen to modify the event pattern tree in response to a node being selected from the display screen;

determining and providing a list of valid operations for the selected node based on a relative position of the selected node in the event pattern tree;

controlling a transformation of the selected node in the hierarchy of nodes on the display screen based in part by the relative position of the selected node in the event pattern tree and a selected operation from the list of valid operations;

configuring a complex event pattern (CEP) engine to initiate an action in response to detecting an occurrence of the complex event pattern, where detecting the occurrence is based, at least in part, on the ECA data; and storing the ECA data in a data store.

\* \* \* \* \*